United States Patent

Weimer

[15] 3,683,193

[45] Aug. 8, 1972

[54] BUCKET BRIGADE SCANNING OF SENSOR ARRAY

[72] Inventor: Paul Kessler Weimer, Princeton, N.J.

[73] Assignee: RCA Corporation

[22] Filed: Oct. 26, 1970

[21] Appl. No.: 83,923

[52] U.S. Cl. ..........250/209, 250/220 M, 307/221 R, 307/311

[51] Int. Cl.......H01j 39/12, H03k 3/42, H03k 21/00

[58] Field of Search......250/209, 220 M; 307/311, 221 R

[56] References Cited

UNITED STATES PATENTS 3,289,010 11/1966 Bacon et al. ........... 307/221 R 3,493,812 2/1970 Weimer................. 250/220 M

*Primary Examiner*—James W. Lawrence
*Assistant Examiner*—T. N. Grigsby
*Attorney*—H. Christoffersen

[57] ABSTRACT

A sensor array having photosensitive elements formed as an integral part of each stage of a shift register chain. Each stage has charge storage means. The photosensitive elements are coupled to the charge storage means for discharging them as a function of externally applied photo signals and, consequently, developing charge deficits in said charge storage means. The shift register, in response to a clocking signal, transfers the charge deficits from one stage to the next along the chain producing a serial output signal at an output terminal.

7 Claims, 11 Drawing Figures

INVENTOR.
Paul K. Weimer

INVENTOR.
Paul K. Weimer
BY
Henry S. [illegible]
ATTORNEY

INVENTOR
Paul K. Weimer

BY

Henry Schanzer

ATTORNEY

INVENTOR
Paul K. Weimer
BY
Henry Schanzer
ATTORNEY

INVENTOR.
Paul K. Weimer
BY
Henry Schwartz
ATTORNEY

INVENTOR.
Paul K. Weimer
BY
Henry Schanzer
ATTORNEY

INVENTOR
Paul K. Weimer
BY
Henry Schwartz
ATTORNEY

INVENTOR.
Paul K. Weimer
BY
Henry Schanzer
ATTORNEY

BUCKET BRIGADE SCANNING OF SENSOR ARRAY

BACKGROUND OF THE INVENTION

Sensors such as image sensor arrays have to be periodically scanned to sample (extract) the information contained in the elements of the sensor. To optimize the sensor-scan generator interface, the scan generator should be as close as possible to the array. To achieve this proximity, the stages of the scanner should as a first requirement be very simple to enable their manufacture with a density comparable to that of the elements of the array.

In two recent articles, one by F. L. Sangster, and K. Teer entitled, "Bucket Brigade Electronics - New Possibilities for Delay, Time-Axis Conversion, and Scanning" (IEEE Journal of Solid-State Circuits, Vol. SC 4, No. 3, pp. 131–136, June 1969) and the other by F. L. Sangster entitled, "Integrated MOS and Bipolar Analog Delay Lines Using Bucket Brigade Capacitor Storage", (IEEE International Solid State Circuits Conference p; 74–75 of Digest of Technical Papers), there is disclosed an analog delay line known as the "Bucket Brigade" which is operable as an analog shift register. The bucket brigade, whose operation is based on the concept of transfer of charge deficit from stage to stage, may be fabricated to form a simple high density shift register which is highly suitable to scan a sensor array.

The bucket brigade, taught by Sangster, may be modified to operate as a parallel output shift register-scan generator which can be connected externally to the rows and columns of a sensor array having row and column address strips. Since the bucket brigade is simpler than previously proposed shift registers, this approach represents a significant simplification of the circuits required to scan arrays. However, using the bucket brigade in this manner is not a completely satisfactory solution since the elements of the array have to be, as in the prior art, accessed by means of leads brought out to the periphery of the array and connected to the output of the scan generators.

It would be desirable if the internal scanning of the elements of sensor arrays were achieved by incorporating a bucket brigade scanning circuit into each row of a sensor.

SUMMARY OF THE INVENTION

A chain of shift register stages has separate charge storage means per stage and transducing elements coupled to said charge storage means for discharging said means as a function of externally applied signals and causing a resulting charge deficit within said charge storage means. Clock means applies pulses to the shift register for transferring the charge deficits from stage to stage along the chain for providing at an output terminal a serial output signal which is a function of the charge deficits developed within said charge storage means.

DETAILED DESCRIPTION OF THE INVENTION

For ease of presentation, N type insulated gate field-effect transistors (IGFETs) of the enhancement type and specifically IGFETs having a metal gate overlying the oxide channel and known as MOS transistors are used in the figures to illustrate the invention. However, it is to be understood that any other suitable type of transistor—e.g., depletion type IGFETs, bipolar transistors, or junction field-effect devices—may be used to practice the invention. The introductory discussion below of the IGFET transistors illustrated in the various figures is for the purpose of assisting the reader more easily to follow the detailed description of the circuits.

1. The devices used have a first electrode and a second electrode referred to as the source and drain and defining the ends of a conduction path, and a control electrode (gate) whose applied potential determines the conductivity of the conduction path. For the P-type IGFET the source electrode is defined as that electrode of the first and second electrodes having the highest potential applied thereto. For an N-type IGFET, the source electrode is defined as that electrode of the first and second electrodes having the lowest potential applied thereto.
2. The devices used are bidirectional in the sense that when an enabling signal is applied to the control electrode, current can flow in either direction in the conduction path defined by the first and second electrodes.
3. For conduction to occur, the applied gate-to-source potential ($V_{GS}$) must be in a direction to forward bias the gate with respect to the source and must be greater in magnitude than a given value which is defined as the threshold voltage ($V_T$). Thus, where the applied $V_{GS}$ is in a direction to forward bias the transistor but is lower in amplitude than $V_T$ the transistor remains cut off and there is substantially no current flow in the conduction channel. [Note that this is also applicable to bipolar devices, where for conduction to occur the base must be forward biased with respect to the emitter by a larger signal than the base-to-emitter junction off-set voltage ($V_{be}$)].
4. When used as a source (or emitter) follower, the voltage ($V_S$) at the source electrode "follows" the signal ($V_G$) applied at the gate but is offset with respect to the gate voltage by an amount equal to the threshold voltage ($V_T$) of the device, [$V_S = V_G - V_T$].

To facilitate the explanation to follow, especially that part of the explanation dealing with the operation of the circuit, it is assumed that $V_T$ is equal to zero. Though not necessarily true, such an assumption does not alter the mode of operation since $V_T$ is a constant and provides a D. C. offset which only affects the d. c. bias of the chain of registers.

Figure 1:
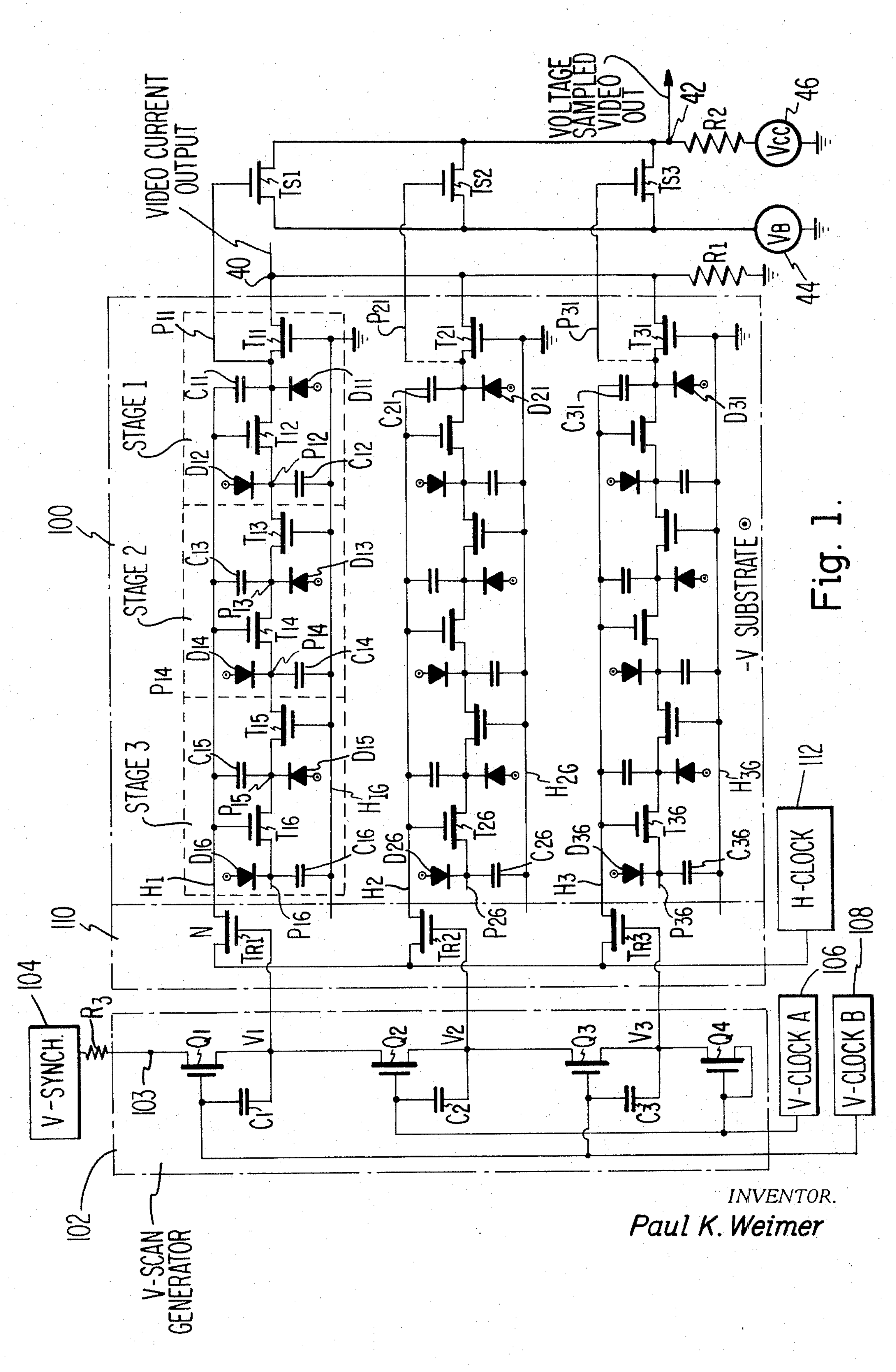
FIG. 1 is a schematic diagram of an image sensor array embodying the invention.

The system of FIG. 1 includes: (1) An image sensor 100; (2) the means for periodically scanning the sensor comprising V-scan generator 102 pulsed by V-synch generator 104 and clocked by V-clock generators A and B (106, 108) and H-clock distributor 110 coupled between the H-clock generator 112 and the sensor 100; and (3) output circuits for extracting the video signals generators by the sensor.

Sensor arrays embodying the invention may have N rows, each row of the array having M stages where M and N represent integers which are greater than zero and which need not be equal. For ease of illustration, the sensor 100 of FIG. 1 is shown having three rows and six transistors per row. Each row has two conductors; one conductor ($H_{1G}$, $H_{2G}$, $H_{3G}$) of each row is connected to ground potential and the other one of the two conductors ($H_1$, $H_2$, $H_3$) of each row is connected through a transistor switch ($T_{R1}$, $T_{R2}$, $T_{R3}$) to H-clock generator 112. The transistor switches ($T_{R1}$, $T_{R2}$, $T_{R3}$) are bidirectional transmission gate transistors having one end of their conduction paths connected to H-clock generator 112, the other end of their conduction paths connected to a different one of the row conductors ($H_1$, $H_2$, $H_3$), and their gate electrodes connected to a different one of the outputs ($V_1$, $V_2$, $V_3$) of the V-scan generator 102.

Each row of the sensor 100 includes a line of transistors having their conduction paths connected in series. For example, row one includes transistors $T_{11}$ . . .$T_{16}$. The drain of one transistor is connected to, or is integral with, the source of the adjacent transistor. Each of the source-drain regions forms a common region or junction point (e.g., $P_{11}$, $P_{12}$ . . $P_{16}$), denoted by a two digit numeral subscript. The first digit denotes the row and the second digit the order of the element along the row. The gate of every other transistor (the even numbered transistors in FIG. 1) is returned to a pulsed conductor ($H_1$, $H_2$, $H_3$), and the gates of the remaining transistors, (the odd numbered transistors in FIG. 1), are connected to the grounded conductor ($H_{1G}$, $H_{2G}$, $H_{3G}$).

Coupled between the gate and drain electrode of each transistor is a capacitor which may be a discrete and/or a distributed component. The capacitor performs a crucial role in the operation of the "Bucket Brigade" by storing charge during one phase of the clock signal and by transferring charge during the other half of the clock signal. In circuits embodying the invention, the capacitor plays the still further role of developing a charge deficit which is proportional to a photo signal. It is the signal (charge deficit) developed across the capacitors which is read out when the array is scanned.

At each of the source-drain regions of the sensor there is a photo diode ($D_{11}$ . . . $D_{36}$). The diodes are operated in the reverse biased condition by returning their anodes to a potential (not shown) which is more negative than the most negative potential applied to their cathodes. In the reversed-biased condition, the photo diodes behave as current generators allowing a current to flow in the reverse direction (cathode to anode) which is proportional to the intensity of the light incident thereon.

V-scan generator 102 includes a line of transistors $Q_1$ . . $Q_4$ having their conduction paths connected in series. The line of transistors resembles a row of the image sensor except that there is no photo sensitive element connected to the nodes of the scan generator 102. Scan generator 102 has one transistor per stage and the drain of each transistor except the last forms an output point ($V_1$, $V_2$, $V_3$) which is connected to the gate of a different one of the transmission gate transistors ($T_{R1}$, $T_{R2}$, $T_{R3}$). The gate of each transistor is coupled through a capacitor ($C_1$, $C_2$, $C_3$) to its drain.

The input end 103 of the series path of V-scan generator 102 is connected to a vertical synch generator 104 which produces a pulse which initiates the readout cycle. The last output point ($V_3$) of the chain is connected through the conduction path of transistor $Q_4$ to V-clock A, 106. The gate electrode of every other transistor (e.g., $Q_1$, $Q_3$) is connected to one of two clock generators (e.g., V-clock B, 108) and the gate electrodes of the remaining transistors of the chain (e.g., $Q_2$, $Q_4$) are connected to a second clock generator (e.g., V-clock A, 106).

Two output circuits for extracting the signals from the image sensor are illustrated in FIG. 1. In one circuit, current sampling is achieved by connecting the drains of the first or right-most transistor ($T_{11}$, $T_{21}$, $T_{31}$) of each row in common to an output terminal 40 which is returned through resistor $R_1$ to ground potential. As described below, a current flows through $R_1$ during the negative going cycle of the H-clock which restores the successive charge deficits entering the first stage of each row. By sensing the current required to restore the charge deficit, a video current output signal is obtained at output terminal 40. Note that since each row is sequentially sampled, the rows of the array may be tied together to provide a multiplexed output.

In the second output circuit, voltage-sampling transistors ($T_{S1}$, $T_{S2}$, $T_{S3}$) have their gate electrodes respectively connected to the source of the first transistor of each row to measure the signal voltage in the moving charge pattern and convert the voltage modulation into a current flowing through resistor $R_2$ to produce an output at output terminal 42. The source electrodes of the voltage sampling transistors are connected in common to a biasing source of potential 44 of amplitude $V_B$ and their drain electrodes are connected in common to output terminal 42 which is connected through resistor $R_2$ to a source of operating potential 46 of amplitude $V_{CC}$.

Figures 2, 3:
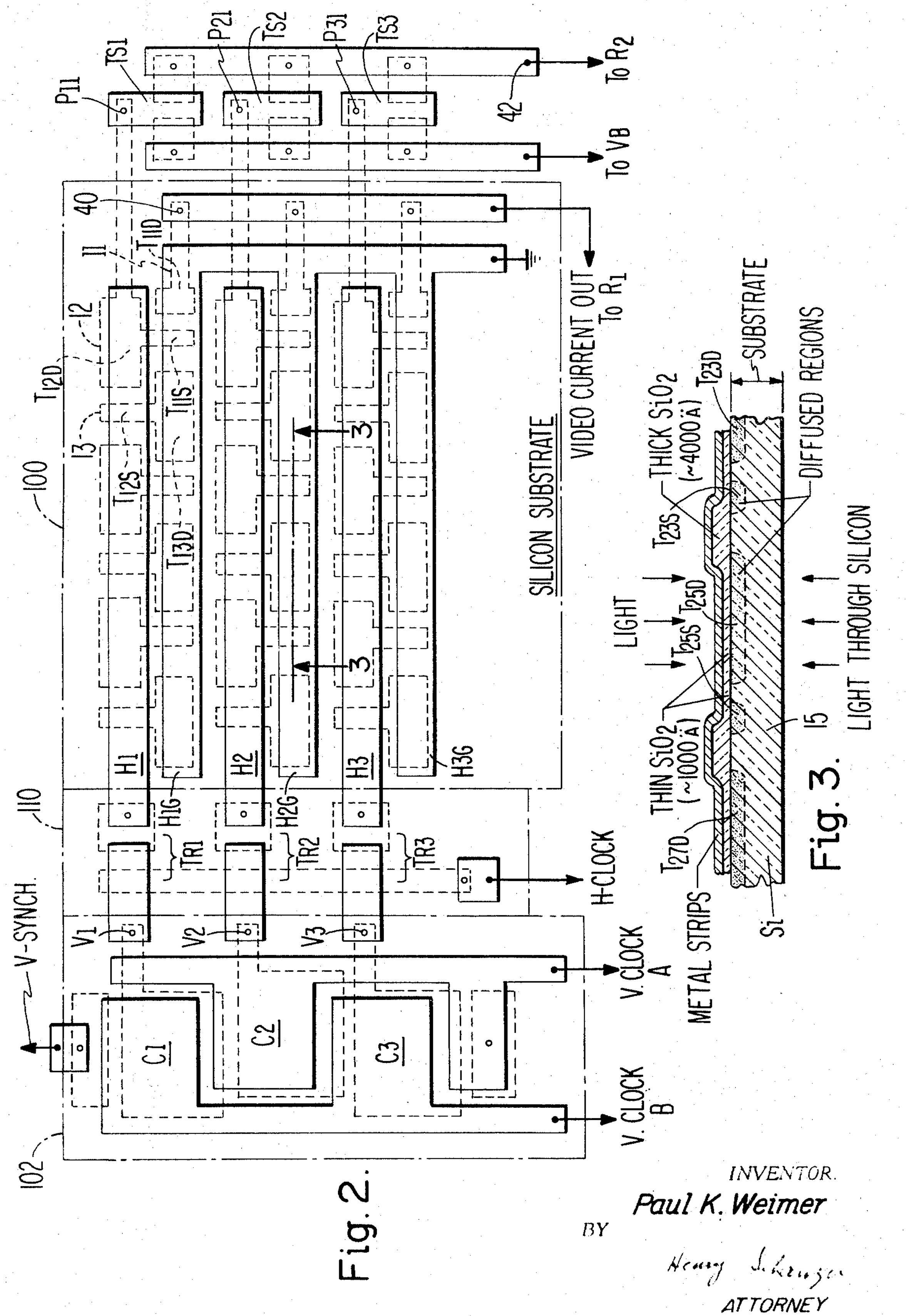
FIG. 2 is the layout of a monolithic integrated circuit version of the circuit of FIG. 1.
FIG. 3 is a cross section of a portion of the circuit of FIG. 2 taken along the lines 3—3 thereof.

The circuit of FIG. 1 may be constructed as shown in FIGS. 2 and 3. FIG. 2 is the layout of a monolithic integrated circuit version of the circuit of FIG. 1.

In FIG. 2 the outlines of the diffused source and drain regions in the silicon are shown by dotted lines. The outline of the metallized gates and connecting strips (all the overlying metallization) are indicated by the solid lines. In FIG. 2, it may be observed that the source of a transistor and the drain of an adjacent transistor are formed by, and are part of, the same diffused area. Thus, for example, the area marked 11 is the drain of transistor $T_{11}$, the area marked 12 is both the source of transistor $T_{11}$ and the drain of transistor $T_{12}$, and the area marked 13 is both the source of transistor $T_{12}$ and the drain of transistor $T_{13}$. The gate electrodes and their associated row conductor are formed from a single metal strip running the length of the row.

Of further interest in the layout of FIG. 2 is the formation of the gate-to-drain coupling capacitors ($C_{DG}$). One of the prime considerations in the design of a bucket brigade type circuit is that $C_{DG}$ be much larger than the capacitance between the gate and the source ($C_{GS}$). This is achieved as illustrated for the sensor 100 by having each diffused region (shown with dotted lines) comprised of a fat rectangular portion and a thin rectangular portion. The fat portion normally acts as the drain of the transistor and provides a large area over which the metal strip (gate) overlaps and the thin rectangular portion normally acts as the source and provides considerably less area. This asymmetry is necessary because the charge deficit (which represents the signal) is always transferred toward the larger capacitance. At the same time the direct capacitive coupling between the source and the drain should be kept to a minimum. The larger capacitance between the gate and the drain is readily achieved by allowing the metal gate to overlap the diffused drain region. This is most evident from an examination of the areas marked $C_1$, $C_2$, $C_3$, in FIG. 2, which represent the $C_{DG}$ of the V-scan generator 102.

In FIG. 2 the oxide insulator is not shown but is assumed to cover the entire silicon surface except where windows have been etched in order to make contact (shown by black dots in FIG. 2) to the diffused regions. The oxide insulator is made thinner in the transistor channels and over the drain regions (to increase $C_{DG}$), but is thicker in the areas where the metal strips cross over the source electrodes or over portions of the semiconductor where no transistor action is desired. It should be noted that in the layout of FIG. 2 a single layer of metallization is required to complete the entire sensor array including the vertical scan generator 102, the H-clock distributor switches, and the video output transistors ($T_{S1}$, $T_{S2}$, $T_{S3}$).

Formation of the photodiodes is shown in FIG. 3, which is a cross-section through 3—3 of the layout of FIG. 2. The diodes may be formed as part of the diffused source and drain regions embedded in the substrate. For the N-channel MOS transistors, the diffused regions ($T_{23D}$, $T_{23S}$, $T_{25D}$, $T_{25S}$. . .) may be of N-conductivity type material and the substrate 11 may be of P-conductivity type material. Each of the N-type regions thus forms a PN junction with the substrate in which it is embedded which in effect forms a diode. Each diffused region thus forms a source ($T_{23S}$, $T_{25S}$) or a drain ($T_{23D}$, $T_{25D}$) for a lateral type MOS transistor and with respect to the substrate forms a diode.

The sensor may be manufactured as shown in FIG. 3 so that it is illuminated by photo signals impinging on the top surface of the array or on the bottom surface of the array. To have a useful photosensitive array, attention must be paid to the construction so as to ensure that light can easily impinge on the diodes. Those arrays which are to be operated with the light falling on the top (metallized) surface may have a relatively thick substrate (10 mils thickness or more) and the metal strips may then be made more narrow or semi-transparent to allow the easy passage of light. Those arrays whose bottom (substrate) surface sense the light or image must have a thin substrate (approximately 0.5 mils thickness) comparable to the diffusion range of photo carriers.

As further described below, the gate-to-drain capacitors of the row transistors which are normally recharged at the end of a line scan are discharged by means of the photo diodes as a function of incident light. The discharge of the capacitors creates a charge deficit across the gate-to-drain capacitors, and it is this charge deficit which is sequentially transported along each row when the row is sampled.

OPERATION OF THE SENSOR OF FIG. 1

The operation of the system of FIG. 1 will now be described with the aid of FIGS. 4A and 4B and, since the operation of one row of the sensor 100 is identical to any other, only the operation of the first row will be described in detail.

Assume that initially, all the capacitors of the first row of sensor 100 are recharged to a given potential. The row is not sampled for a period of time, called the integration time ($t_i$), during which the photodiodes operate as current generators and conduct current proportional to incident light intensity, thereby partially discharging the capacitors. Following the integration period is the read out period ($t_r$) during which the rows are sampled, the information stored in the elements of a row is serially read out, and the capacitors (charge storage means) are concurrently recharged.

Figure 4A:
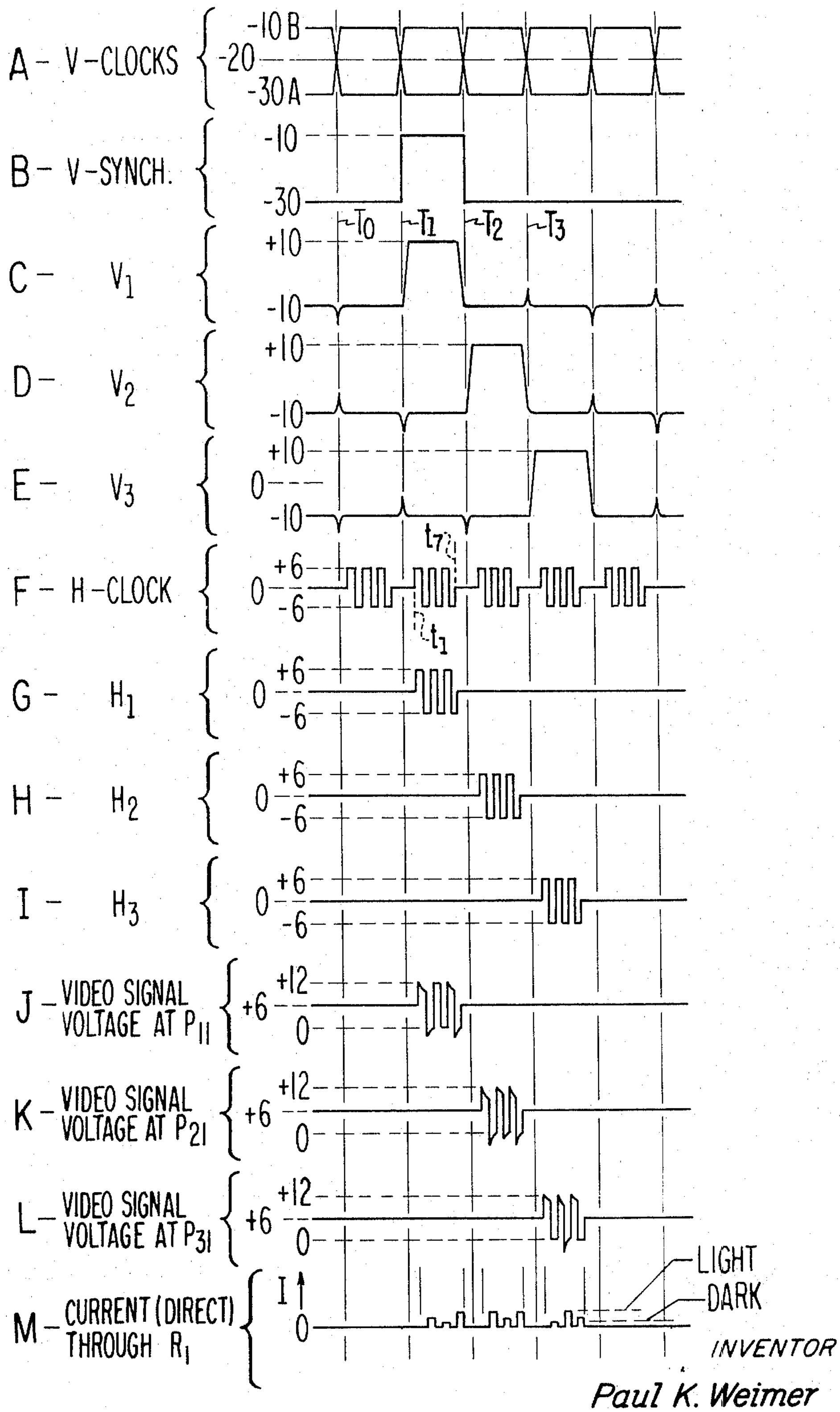
FIGS. 4A and 4B are diagrams showing typical waveforms of the circuit of FIG. 1.

A readout and recharge cycle is initiated by the application of a V-synch pulse of the type shown in waveform B of FIG. 4A to terminal 103 of V-scan generator 102 which then produces a positive going pulse at $V_1$ (waveform C of FIG. 4A) which enables transistor $T_{R1}$. With transistor $T_{R1}$ "closed" bipolar pulses generated by H-clock generator 112 are applied to the $H_1$ line. The H-clock pulses (waveform F, FIG. 4A) are bipolar, going a positive 6 volts and then a negative 6 volts with respect to a point of reference potential (ground).

Figure 4B:
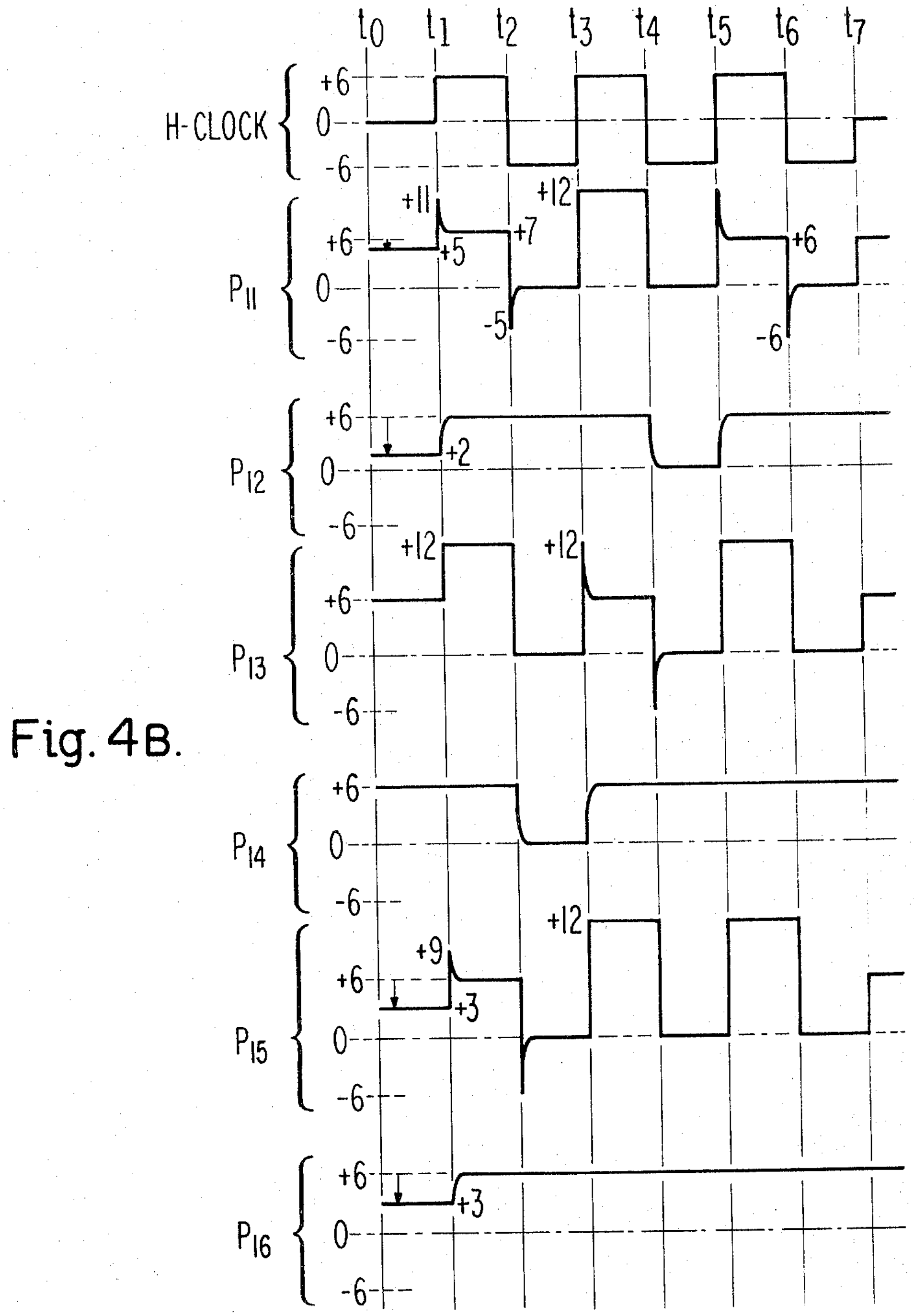

For a better understanding of the signal propagation along the signal transmission path of a row, FIG. 4B illustrates the waveforms generated at various junction points in response to sampling clock signals applied to a row. FIG. 4B illustrates a full line (row) scan which for the circuit of FIG. 1 (which shows six transistors per row which amount, as described below, to three stages) requires three full cycles of the H-clock (from time $t_1$ to time $t_7$).

Assume, for tutorial purposes, that at time $t_1$ the potential at various junction points of the first row, which at the beginning of the integration period were all at +6 volts are now just prior to $t_1$ as follows: $P_{11}$ is at +5 volts; $P_{12}$ is at +2 volts; $P_{13}$ and $P_{14}$ are at +6 volts (corresponding to diodes $D_{13}$ and $D_{14}$ being in the dark during $t_i$ and assuming no leakage); $P_{15}$ and $P_{16}$ are at +3 volts. Assume also that all the gate-to-drain capacitors of a row are substantially equal, which is reasonable in view of the similarity of the structure and methods of manufacturing them.

Transition of H-clock from zero volts to +6 volts at $t_1$:

Given the above initial conditions and assumptions, note that as shown in FIG. 4B the first cycle of the H-clock applied to the $H_1$ line at $t_1$ is a positive going pulse of 6 volts amplitude (0 volts to +6 volts). This applies a positive (+6 volts) potential to the gate electrodes of the even numbered transistors ($T_{12}$, $T_{14}$, $T_{16}$) while the odd numbered transistors remain "off". Simultaneously, every odd numbered junction point ($P_{11}$, $P_{13}$, $P_{15}$) whose associated capacitors ($C_{11}$, $C_{13}$, $C_{15}$) is connected to the $H_1$ clock line has its potential raised by +6 volts since the voltage across a capacitor cannot change instantaneously. The potential at $P_{11}$ thus goes from +5 volts to +11 volts, the potential at $P_{13}$ goes from +6 volts to +12 volts and the potential at $P_{15}$ goes from +3 volts to +9 volts.

H-clock at +6 volts from $t_1$ to $t_2$:

Following the H-clock transition the following occurs during the $t_1$ to $t_2$ time period:

1. Transistor $T_{12}$ with +6 volts at its gate, +11 volts at its drain ($P_{11}$) and +2 volts at its source ($P_{12}$), conducts in the source follower mode until the potential at its source ($P_{12}$) equals the +6 volt potential at its gate ($V_T$ is assumed zero). The potential at $P_{12}$ (see FIG. 4B) thus goes exponentially from +2 volts to +6 volts. At that point, transistor $T_{12}$ effectively turns off, preventing any further conduction. Since the potential rise across capacitor $C_{12}$ can only come from capacitor $C_{11}$ (and since $C_{11} \cong C_{12}$) the 4 volt increase in the voltage across the capacitor $C_{12}$ (from 2 volts to 6 volts) must give rise to a 4 volt decrease in the potential across capacitor $C_{11}$. $P_{11}$ (see FIG. 4B) thus goes exponentially from 11 volts to 7 volts. The potential at $P_{11}$ is applied to the gate of transistor $T_{S1}$ which produces a corresponding output signal at output terminal 42.
2. Transistor $T_{14}$ has 6 volts at its gate, 12 volts at its drain ($P_{13}$) and 6 volts at its source ($P_{14}$). Since the $V_{GS}$ of transistor $T_{14}$ is zero, transistor $T_{14}$ does not conduct and $P_{13}$ remains at +12 volts and $P_{14}$ remains at +6 volts.
3. Transistor $T_{16}$, with +6 volts at its gate, +3 volts at its source ($P_{16}$) and +9 volts at its drain ($P_{15}$) conducts until the potential at its source ($P_{16}$) equals its gate potential which is 6 volts. At that point, transistor $T_{16}$ effectively cuts off since $V_{GS} = 0$. As for stage No. 3, the increase in potential across $C_{16}$ is obtained at the cost of an equal decrease in potential across capacitor $C_{15}$ (since the two capacitors are assumed equal), whereby the voltage at $P_{15}$ drops to +6 volts.

At time $t_2$ the potentials at the junction points of the row are as follows: $P_{11}$ is at +7 volts; $P_{12}$ is at +6 volts; $P_{13}$ is at +12 volts; $P_{14}$ is at +6 volts; $P_{15}$ is at +9 volts; and $P_{16}$ is at +6 volts.

During the $t_1 - t_2$ time interval all the even numbered capacitors have been recharged to +6 volts and their charge deficit has been added to that of the adjacent odd numbered capacitor. The advantage of this addition is that the ensuing signal is of greater amplitude, being the some of two separate signals, and is thus more easily read out. For example, the photo signal at $P_{11}$ is 5 volts which is the sum of the 1 volt deficit and the 4 volt deficit initially (before $t_1$) present across $C_{11}$ and $C_{12}$, respectively. The 5 volt signal at $P_{11}$ is obtained by subtracting the 7 volt level now present from the 12 volt level which corresponds to the zero (no discharge) signal condition. Similarly, the signal at $P_{15}$ is 6 volts which is 6 volts less than the zero signal value of 12 volts and the 6 volts is 6 volts is the sum of the 3 volt deficit initially present across each of $C_{15}$ and $C_{16}$. Note also that $P_{13}$ is at 12 volts which indicates no signal (zero charge deficit) initially present across either $C_{13}$ or $C_{14}$.

Note, however, that since the signals stored in a pair (odd and even numbered) of capacitors are commingled, it takes a pair of elements (two transistors, two capacitors and two photo responsive elements) to form a single information stage. It should be understood, however, that only one photo responsive element per stage would be sufficient and such element could be connected to either of the two junctions of a stage.

Transition of H-clock from +6 volts to −6 volts at $t_2$:

At time $t_2$ the horizontal clock pulse makes a transition from +6 volts to −6 volts. This applies a negative 6 volts to the gates of the even numbered transistors ($T_{12}$, $T_{14}$, $T_{16}$) and turns them off. The transition from +6 volts to −6 volts causes a negative going pulse of 12 volts amplitude to be coupled by means of capacitors $C_{11}$, $C_{13}$, and $C_{15}$ to the odd numbered junction points $P_{11}$, $P_{13}$ and $P_{15}$, which tends to turn on the odd numbered transistors whose gates are grounded. As shown in FIG. 4B, the potential at junction point $P_{11}$ goes from +7 volts to −5 volts; the potential at $P_{13}$ goes from +12 volts to zero volts and the potential at $P_{15}$ goes from +6 volts to −6 volts.

H-clock at −6 volts from $t_2$ to $t_3$:

Following the H-clock transition, the following occurs during the $t_2$–$t_3$ time period:

1. Transistor $T_{11}$ conducts because its gate is grounded, its drain is connected through $R_1$ to ground potential, and its source is −5 volts. Transistor $T_{11}$ will conduct current through $R_1$ in a direction to charge the potential at junction point $P_{11}$ back to ground. Assuming as mentioned before that the $V_T$ of transistor $T_{11}$ is zero volts, $P_{11}$ is eventually brought back to zero potential.

The current flowing through $R_1$ replenishes the charge deficit developed across $C_{11}$ and $C_{12}$ during the previous integration time period, and sensing the current through $R_1$ provides a current sampled output at terminal 40 which is proportional to the charge deficit. Also the current signal across $R_1$ is time displaced by one-half cycle with respect to the voltage output sensed at $P_{11}$ by transistor $T_{S1}$.

2. Transistor $T_{13}$ has zero volts at its source ($P_{13}$) and gate and does not conduct.
3. Transistor $T_{15}$ on the other hand has −6 volts at its source electrode ($P_{15}$), +6 volts at its drain ($P_{14}$) and zero volts at its gate. Transistor $T_{15}$, therefore, conducts and transfers charge from $C_{14}$ to $C_{15}$ until the potential at $P_{15}$ is at zero volts. This transfer of charge causes the potential at $P_{14}$ to decrease by 6 volts (from +6 volts to zero volts), which was the deficit across $C_{14}$. At the end of the negative half-cycle of the first pulse, the various junction point potentials are as follows:

$P_{11}$ = 0 volts; $p_{12}$ = +6 volts; $P_{13}$ = 0 volts; $P_{14}$ = 0 volts; p $P_{15}$ = 0 volts; and $P_{16}$ = 6 volts.

Thus, just prior to $t_3$ the signal developed in stage 1 has been read out, the total signal developed in stage 2 has been transferred to the even numbered capacitor ($C_{12}$) of stage 1, and the total signal developed in stage 3 has been transferred to the even numbered capacitor ($C_{14}$) of stage 2 while the even numbered capacitor ($C_{16}$) of stage 3 remains recharged at +6 volts.

Transition from −6 volts to +6 volts at $t_3$:

At time $t_3$ the clock pulse makes a transition from −6 volts to +6 volts. This tends to turn on the even numbered transistors ($T_{12}$, $T_{14}$, $T_{16}$) by applying +6 volts to their gates, and couples a positive going pulse of 12 volts amplitude to junction points $P_{11}$, $P_{13}$, $P_{15}$. The instantaneous potentials present at the junction points are are: $P_{11}$ = +12 volts; $P_{12}$ = +6 volts; $P_{13}$ = +12 volts; $P_{14}$ = 0 volts; $P_{15}$ = +12 volts and $P_{16}$ = +6 volts.

H-clock at +6 volts from $t_3$ to $t_4$:

Following the positive going transition of the second cycle of the clock, the following cocurs:

1. Since the source ($P_{12}$) and the gate of transistor $T_{12}$ are at +6 volts, it does not conduct and $P_{11}$ and $P_{12}$ remain at +12 volts and +6 volts respectively. The voltage levels at $P_{11}$ and $P_{12}$ are the signals which were present at junction points $P_{13}$ and $P_{14}$ one clock cycle earlier. The signal now at $P_{11}$, which is the information initially (at $t_1$) contained in stage 2, is applied to the gate of transistor $T_{S1}$ and read out at voltage sampled output 42. The +12 volts level at $P_{11}$ corresponds to the signal condition of a non-discharged capacitive element (no charge deficit = no signal).
2. Transistor $T_{14}$ has +6 volts on its gate and 0 volts at its source, and therefore, conducts until the potential at its source ($P_{14}$) is 6 volts. The corresponding potential at $P_{13}$ decreases from +12 volts to +6 volts. The voltage levels now at $P_{13}$, $P_{14}$ are the signals which were present at junction point $P_{15}$ and $P_{16}$, respectively, one clock cycle earlier.
3. Transistor $T_{16}$ has +6 volts at its source and gate and does not conduct, causing $P_{15}$ to remain at +12 volts. Junction point $P_{14}$ as well as junction point $P_{16}$ will now remain at +6 volts (recharged) until the end of the readout cycle.

At time $t_4$ the H-clock makes a transition from +6 volts to −6 volts and the circuit responds in the same manner which it did at time $t_2$. As shown in FIG. 4B, $P_{11}$ and $P_{15}$ go to 0 volts, $P_{12}$ is at +6 volts, $P_{13}$ goes to −6 volts, $P_{14}$ and $P_{16}$ remain at +6 volts.

In the time interval from $t_4$ to $t_5$ the circuit behaves in a manner similar to that described for the $t_2$ to $t_3$ time period. $P_{11}$ and $P_{15}$ remain at zero volts, $P_{14}$ and $P_{16}$ remain at +6 volts, $P_{13}$ goes exponentially from −6 volts to zero volts and $P_{12}$ goes exponentially from +6 volts to zero volts.

At time $t_5$ the H-clock makes a transition from −6 volts to +6 volts, and the circuit responds in a similar manner as it did at time $t_3$. As shown in FIG. 4B: $P_{11}$, $P_{13}$, and $P_{15}$ go to +12 volts; $P_{12}$ remains at 0 volts and $P_{14}$ and $P_{16}$ remain at +6 volts.

In the time interval from $t_5$ to $t_6$, $P_{12}$ goes exponentially from 0 to +6 volts, and $P_{11}$ decreases correspondingly from +12 volts to +6 volts. The signal initially present in stage 3 is now ready to be read out from $P_{11}$. The remaining junction points remain undisturbed.

At time $t_6$, the H-clock makes a transition from +6 volts to −6 volts causing $P_{11}$ to go to −6 volts and $P_{13}$ and $P_{15}$ to go to zero volts, while $P_{12}$, $P_{14}$, and $P_{16}$ (all the even-numbered junction points and their associated capacitors) are maintained at +6 volts.

In the time interval from $t_6$ to $t_7$, junction point $P_{11}$ goes exponentially from −6 volts to zero volts, the recharging current being drawn through resistor $R_1$ as explained above. At the end of this time interval, the even-numbered junction points ($P_{12}$, $P_{14}$, $P_{16}$) are at +6 volts as described above and the odd-numbered junction points ($P_{11}$, $P_{13}$, $P_{15}$) are at 0 volts.

At time $t_7$ the H-clock makes a transition from −6 volts to ground potential. This applies 0 volts to the gate electrodes of all the even-numbered transistors, which gate voltage is insufficient to turn any one of them on. However, a positive going 6-volt pulse is coupled through the odd-numbered capacitors to the odd-numbered junction points, establishing the potential of the latter at +6 volts. Therefore, at time $t_7$, which is the end of the line (row) scan, all the junction points of the row and their associated capacitors have been recharged to a +6 volts.

In summary, on the first positive half cycle of a clock pulse, the information contained in the two capacitors of each stage is combined to form a single signal whose potential is equal to the sum of the individual photodiode signals. These signals are then serially propagated from stage to stage and may be read out either as a voltage sampled output or, half-a-clock cycle later, as a current sampled output at terminal 40.

It may be noted that for proper operation with continuous illumination, the sample or read-out time should be short compared to the integration time. This condition is readily met with normal television scan rates where the integration time for each line is the total frame time, which is more than 500 times longer than the time to scan a single line. The reason for this requirement is to prevent the modification of the signal as it is being propagated along the chain. Alternatively, if the incident illumination is cut off during the scan period, the above requirement on the scan rate is removed.

Sometime following the sampling of row 1, a positive pulse is produced at terminal $V_2$, enabling transistor $T_{R2}$ to couple conductor $H_2$ to H-clock generator 112. In the meantime, the pulse at $V_1$ goes negative, disabling transistor $T_{R1}$. Following the sampling of the second row of the sensor, the process is repeated (see waveform E of FIG. 4A) with the transmission gate $T_{R3}$, coupling the next conductor $H_3$, being enabled. This process is continued until all the rows of image sensor 100 are read out.

Any number of prior art scan generators (shift registers) may be used to sequentially apply pulses to the gates of the transmission gate transistors ($T_{R1}$. .$T_{R4}$). However, a bucket brigade V-scan generator 102 such as shown in the FIG. 1 and constructed as shown in FIG. 2 is preferred, since it is compatible in terms of simplicity of design and technology with the sensor 100. By appropriate choice of the voltage levels of the V-synch pulse shown in waveform B of FIG. 4A and also by appropriate choice of the voltage levels of the V-clock, a scan generator requiring but a single transistor per stage may be constructed.

The A and B V-clock outputs are complementary, each clock producing pulses of 20 volt amplitude which vary ±10 volts about a negative 20 volt level. Also, the level of the V-synch output is normally about −30 volts until $T_1$ time at which point an initiate pulse is generated and the output makes a transition from −30 volts to −10 volts.

Prior to time $T_1$ while the V-synch output is held at −30 volts, each of the output terminals ($V_1$, $V_2$, $V_3$, $V_4$) remains at a steady state value of approximately −10 volts (except for periodic transients of 20 volts amplitude in the positive and negative direction).

Consider the potentials at terminals $V_1$, $V_2$, and $V_3$ at time $T_o$ (the half-cycle prior to $T_1$). The V-clock (B) makes a transition to its most negative value (−30 volts) while the V-clock (A) makes a transition to its most positive value (−10 volts). The potential at $V_1$ and $V_3$ is momentarily carried to −30 volts by means of the capacitive coupling of $C_1$ and $C_3$, respectively, and $V_2$ is momentarily carried to +10 volts by means of the capacitive coupling of $C_2$. Transistor $Q_2$ with −30 volts at its source ($V_1$), +10 volts at its drain ($V_2$) and −10 volts at its gate (A-clock) conducts in the source follower mode restoring the potential at $V_1$ to approximately −10 volts and simultaneously (by transfer of charge deficits to $C_2$) reduces the potential at $V_2$ to approximately −10 volts. Concurrently transistor $Q_4$ also operating in the source follower mode returns $V_3$ to the −10 volt level.

At time $T_1$, the V-clock (A) is switched to its most negative value (−30 volts), the V-clock (B) is switched to its most positive value (−10 volts) and the V-synch output is switched to −10 volts. $V_1$ is carried to +10 volts by capacitive coupling through $C_1$ and remains at that level until $T_2$ because transistor $Q_1$ has −10 volts on its gate and on its source and is therefore non-conducting and transistor $Q_2$ with −30 volts on its gate is also non-conducting.

At time $T_2$, V-clock (A) is switched positively to −10 volts and V-clock (B) is switched negatively to −30 volts. The potential at $V_1$ is carried negatively by capacitive coupling through $C_1$ from +10 to −10 volts. The potential at $V_2$ is carried positively from −10 to +10 volts by capacitive coupling through $C_2$ to the V-clock (A) and remains at that potential until $T_3$. Transistor $Q_2$ does not conduct and no charge is transferred from $V_2$ to $V_1$ during this period ($T_2$–$T_3$) because $V_1$ (which is the source of transistor $Q_2$) is already at the potential (−10 volts) of the gate of transistor $Q_2$ which is at the V-clock (A) potential (−10 volts).

At time $T_3$, V-clock (A) goes to −30 volts and V-clock (A) goes to −10 volts. The potential at $V_1$ goes to +10 volts (by the capacitive coupling of $C_1$) but since V-synch is now at −30 volts $V_1$ is drawn back to −10 volts due to resistor $R_3$ which is chosen to introduce the required amount of charge into capacitor $C_1$ to return $V_1$ to −10 volts. The potential at $V_2$ is carried from +10 volts to −10 volts by capacitive coupling through $C_2$ to the V-clock (A). The potential at $V_3$ goes to +10 volts by capacitive coupling of $C_3$ and remains at that level until $T_4$ since transistor $Q_4$ does not conduct having −10 volts at its gate and −10 volts at its source ($V_2$).

Thus, a positive-going pulse is transferred down the register advancing from one transistor to the next on each half cycle of the clock. Charge is transferred on each cycle through every transistor except where the positive going pulse occurs. By proper choice of clock voltages and of the polarity and magnitude of the synch input pulse a parallel output scan generator has been obtained which requires only one transistor and one capacitor per stage. However, operation of a bucket brigade in this manner requires excellent charge storage at each element and a high value of transfer efficiency from one stage to the next in order for the pulse not to be degraded in amplitude or width after many stages.

At this point is is noted that the bucket-brigade shift register scan generators and internally scanned sensors described in this application should preferably satisfy certain conditions in order to operate effectively in the manner described. Three important criteria are:

1. Charge Shortage Capability - For highest sensitivity the (RC) time constant for leakage of charge from the elemental capacitors should be long compared to the scanning period. In the MOS devices leakage from the reverse-biased diffused regions to the substrate will determine this time constant. Unless low leakage is obtained by the proper silicon processing full integration of light will be impossible and signals can not be transferred over many stages without losses.
2. High Transfer Efficiency - For television applications, approximately five hundred stages or one thousand transfers are required for each horizontal row. In order to avoid excessive deterioration of the signals, which are transferred over the full width of the sensor, efficiency of transfer of charge from one element to the next must exceed 99.9 percent. This requires that the transistor operating characteristics should be excellent: i.e., they should preferably have a high ratio of on-to-off conductance and should turn on and off rapidly when gated. The ratio of transconductance to the elemental capacitance should be large in order to operate at the 5–10 megacycle horizontal clock frequencies required for broadcast television. The elemental gate-drain (or gate-collector) capacitance should be no larger than necessary to contain the maximum signal to be transported. Stray capacitance from drain (collector) to substrate, or to source (emitter), or to the other gate must be minimized. In the MOS structure this means each gate should have maximum overlap of its drain and minimum overlap of its source (as illustrated in FIG. 2).
3. Freedom From Defective Elements - With internally scanned sensors any interruption of signal transfer at any point along a row will make all elements in the row prior to that point inoperative. This places a more severe requirement on the mechanical perfection of the sensor than is required for an *x*–*y* address sensor where a single defective element may appear only as a light or dark spot.

It is evident that various trade-offs and compromises can be made between these three requirements. Thus, transfer efficiency in a given sensor might be improved by operation at a lower horizontal clock frequency, provided the storage characteristics of the sensor are sufficiently long to tolerate the extended frame time.

All three requirements are eased when fewer elements are required in the sensor.

Although the paragraph dealing with high transfer efficiency has stressed the application of the bucket brigade sensors to television it should be pointed out that the same structures can be used with computers as optical readers or memories having fewer elements and using signal levels which are digital rather than analog. Since the bucket brigade element is not bistable, the registers must operate in the dynamic mode. Static storage or light integration times would be limited by the (RC) leakage time constant of the elemental capacitors.

As may be seen in waveforms C, D, and E of FIG. 4A, there are spikes produced at the $V_1$, $V_2$, and $V_3$ outputs corresponding to the transitions of the V-clocks. Normally the positive going spikes are highly undesirable since they turn on the transmission gate transistors connected to the spike producing outputs. However, as may be seen from waveform F of FIG. 4A, the H-clock is at zero volts when the spikes (at $V_1$, $V_2$, or $V_3$) occur. The positive-going spikes at $V_1$, $V_2$, and $V_3$ are now advantageous since by turning "on" transistors $T_{R1}$, $T_{R2}$, and $T_{R3}$ they cause the line capacitance associated with conductors $H_1$, $H_2$, and $H_3$ to be periodically (i.e.) charged to zero volts, thereby maintaining the potential of that line at ground potential.

The H-clock pulses shown in waveform F of FIG. 4A are distributed to the pulsed row conductors at the relative times shown in FIGS. G, H, and I.

Typical signal voltage outputs at the first junction points of each row, fully described above for row 1, are shown in waveforms J, K, and L.

Waveform M illustrates the current flowing through $R_1$ corresponding to the signals appearing at $P_{11}$, $P_{21}$, and $P_{31}$.

Note that in FIG. 1 the rows of the sensor are driven by a single bipolar clock while the V-scan generator is driven by two (complementary) unipolar (with respect to −30 volts) clocks. This demonstrates that either clock method may be used to operate bucket brigade type circuits.

DETAILED DESCRIPTION OF FIG. 5

Figure 5:
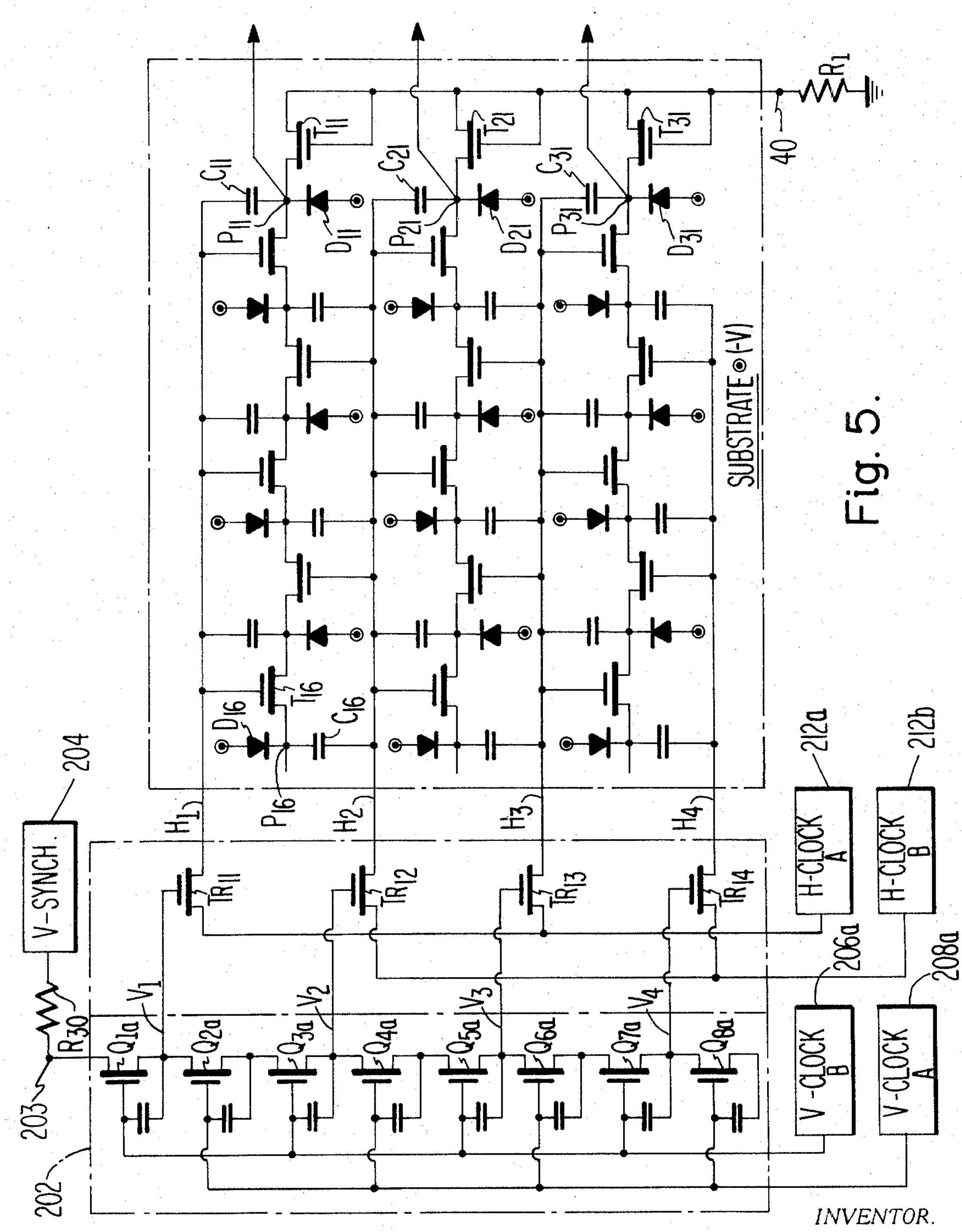
FIG. 5 is a schematic diagram of another image sensor embodying the invention.

In FIG. 5 there is illustrated an image sensor 200 in which adjacent rows share a common conductor. The construction of part of the circuit may be seen in FIG. 6 which shows a layout of the sensor 200 in which adjacent rows share a metal strip. Conductor $H_2$ is common to rows 1 and 2 and conductor $H_3$ is common to rows 2 and 3. An MOS sensor was fabricated according to this layout comprising 15 rows having 32 MOS transistors each. As is evident from an examination of the layout, this circuit is extremely compact making very efficient use of silicon chip area.

Each of the row conductors ($H_1$, $H_2$, $H_3$, $H_4$) of image sensor 200 is connected to one end of the conduction path of a bipolar transistor transmission gate ($T_{R11}$, $T_{R12}$, $T_{R13}$, $T_{R14}$). The other ends of the conduction paths of the odd numbered transmission gates ($T_{R11}$, $T_{R13}$) are connected in common to H-clock (A), 212*a*, and the other ends of the even numbered transmission gates ($T_{R12}$, ,$T_{R14}$) are connected in common to H-clock (B) 212*b*. Each gate of the transmission gates is connected to a different one of the output points of V-scan generator 202.

The vertical scan generator 202 is a bucket-brigade shift register comprising a chain of transistors having their conduction paths connected in series. A capacitor is connected between the drain and gate of each transistor and a pair of transistors form one stage, each stage having an output connected to the gate of a different one of the transistors of the H-clock distributor 210. Every other transistor of scan generator 202 is driven by a first V-clock source 206*a* and the remaining transistors are driven by a second clock source 208*a* whose pulses are 180° out of phase with those of the first clock. The use of two transistors per stage as shown in FIG. 5 is required because the simpler scan generator shown in FIG. 1 having only one transistor per stage is not capable of producing a pair of consecutive "on" pulses which can be applied during overlapping periods to two consecutive lines. As will be evident from FIG. 7, overlapping consecutive pulses are required to simultaneously connect both horizontal clocks to each pair of conductors for scanning of the interstitial row of elements. As in FIG. 1, the sensor output may be derived from current output terminal 40 or by voltage sensing means from the first junction point ($P_{11}$, $P_{21}$, $P_{31}$) of each row.

The propagation of signals along the rows of sensor 200 is achieved in a manner similar to that already described for the circuit of FIG. 1. The distribution of the H-clock pulses to the row conductors, however, is different than for the circuit of FIG. 1 (due to the sharing of the row conductors) and is described below.

Figure 7:
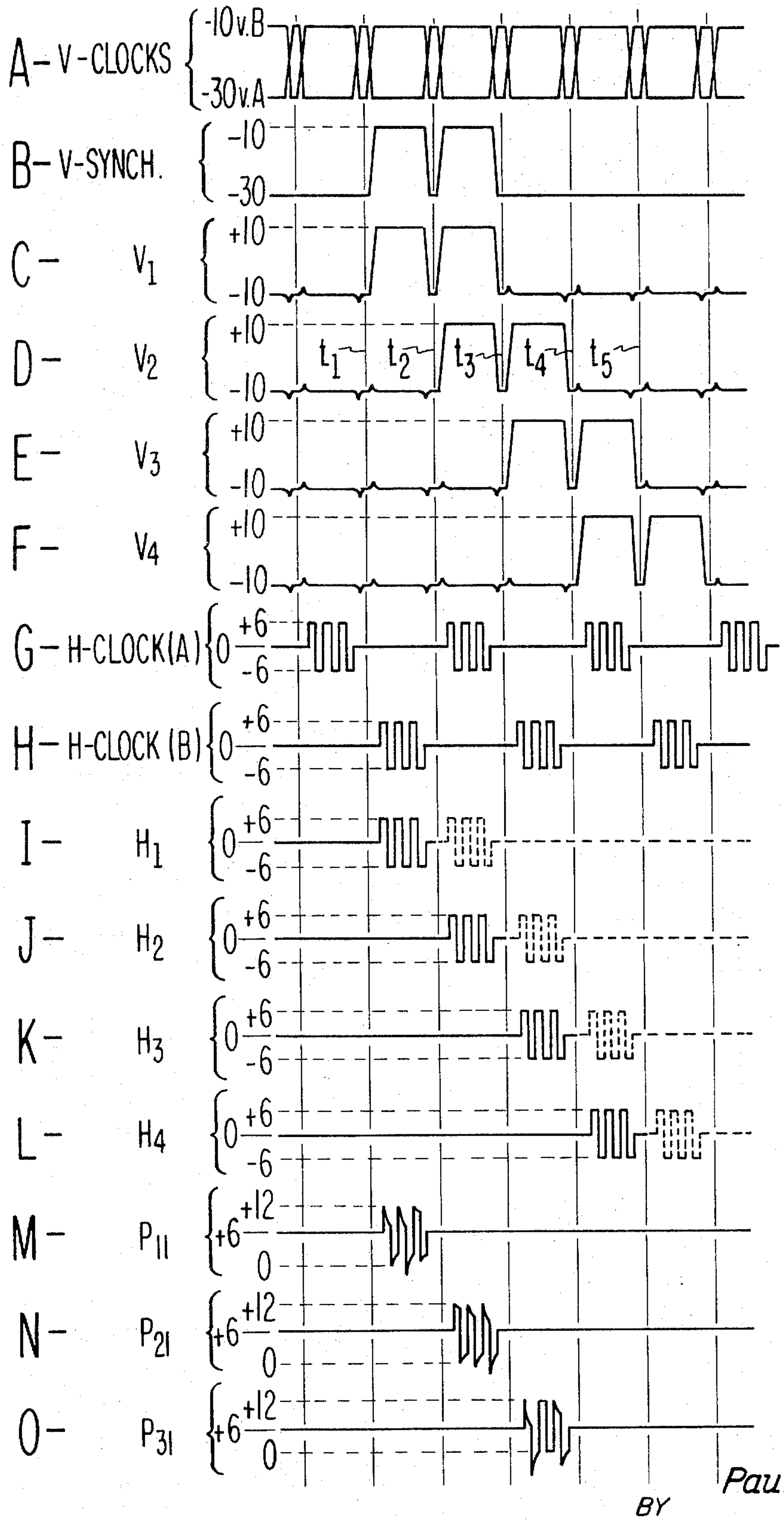
FIG. 7 is a diagram showing typical waveforms of the circuitry of FIG. 5.

To obtain a desired scanning sequence of the sensor 200, the nonsymmetrical A and B V-clock signals shown in waveform A of FIG. 7 are used. Though in this instance asymmetrical clock pulses are preferred, in general, the clocking pulses may or may not be symmetrical (i.e., the length of one half cycle may not be equal to the length of the other half cycle of a clock pulse). A V-synch initiate pulse, comprising two closely spaced positive going pulses, as shown in waveform B of FIG. 7, is employed to produce the desired pulses at the outputs of V-scan generator 202. In addition, H-clock A and B outputs comprising a string of alternately generated bipolar pulses as shown in waveforms G and H of FIG. 7 drive the clock lines of the sensor 200.

Following the application of the V-synch pulses to terminal 203, a positive going pulse similar in shape to the V-synch pulse but which varies between −10 and 110 volts is produced at $V_1$. The gate of transistor $T_{R11}$ is connected to $V_1$ and is enabled by positive pulses produced thereat. With transistor $T_{R11}$ turned on, the $H_1$ conductor is clamped to the H-clock (A). During the $t_1$ to $t_2$ time interval, H-clock (A) is at zero volts which clamps conductor $H_1$ to ground potential and nothing occurs until time $t_2$.

At time $t_2$, a positive pulse is produced at $V_1$ and $V_2$ and biases on $T_{R11}$ and $T_{R12}$ until time $t_3$. During the $t_2$–$t_3$ time interval, the H-clock (A) pulses are applied to the $H_1$ conductor but the $H_2$ conductor is grounded since the H-clock (B), which is coupled to $H_2$, is at 0 volts. The cycling of the H-clock (A) pulses samples the elements of the first row, reading out its contents, as explained for the first row of the circuit of FIG. 1.

At time $t_3$, the first row has been read out, transistor $T_{R11}$ is turned off but transistor $T_{R12}$ is turned on for another cycle and concurrently transistor $T_{R12}$ is also turned on. $T_{R12}$ now couples the bipolar pulses generated by the H-clock (B) to the $H_2$ conductor while transistor $T_{R13}$ couples the H-clock (A), which now is at 0 volts, to the $H_3$ conductor.

At time $t_4$ the process described is repeated for $T_{R13}$ and $T_{R14}$ as shown in waveforms E and F of FIG. 7.

The solid line waveforms I, J, K, and L of FIG. 7 illustrate that only two adjacent conductors of the sensor are connected to the clocks at any one time. While the upper of the pair of conductors is being pulsed, the lower conductor is maintained at a point of reference potential (0 volts). The connection of both conductors to the clocks is required to obtain scanning of the interstitial row of elements. Although the pulsing of a given conductor row activates the gates of the row of elements above it as well as below it, because of the sensor structure, no scanning action occurs in the row above because the intermediate gates are now disconnected from the clock. As shown by the dotted lines of waveforms I, J, K, and L of FIG. 7, the conductor N–1 above the one being pulsed $H_N$ tend to follow the voltage swing of $H_N$ due to capacitive coupling and thus will not cause the row above to be scanned again.

In response to the bipolar H-clock pulses applied to the row conductors, the photo signals developed across the charge storage means of each row are sequentially read out, producing voltage signals at the first junction point of each row as shown in waveforms M, N, and O of FIG. 7. These waveforms are similar to the corresponding waveforms J, K, and L of FIG. 4A and they may be used in the same way to drive the gates of a column of voltage sampling transistors. Alternatively the video signal current flowing through the load resistor $R_1$ may be used as the output video signal.

It may be noted that instead of the even-odd method of connecting the clocks illustrated in FIG. 5 there can also be used other types of clocks to drive the sensor 200. For example, if the two clock waveforms illustrated in lines G and H of FIG. 7 were modified so that both clocks provided complementary bidirectional pulses for a given pair of lines, the bucket brigade of the sensor itself could be operated in a true "double clock" mode instead of the "single clock" mode which has been used in the waveforms of FIGS. 4 and 7.

Figure 6:
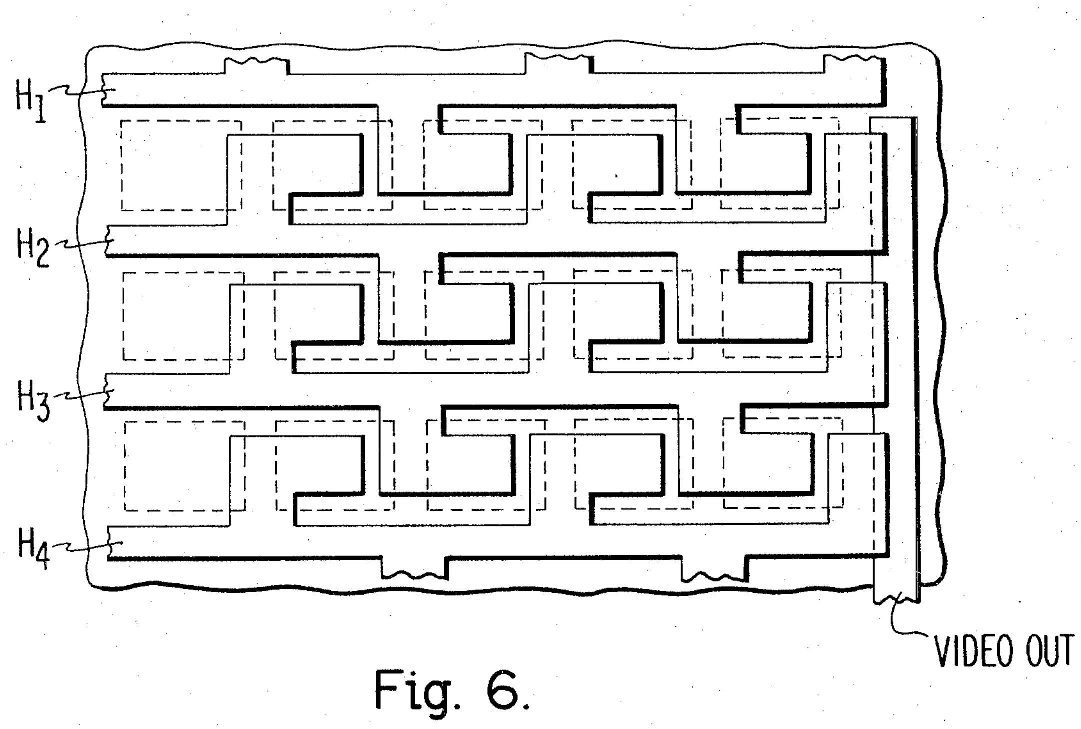
FIG. 6 is the layout of the integrated array circuit version of the circuit of FIG. 5.
Figure 8:
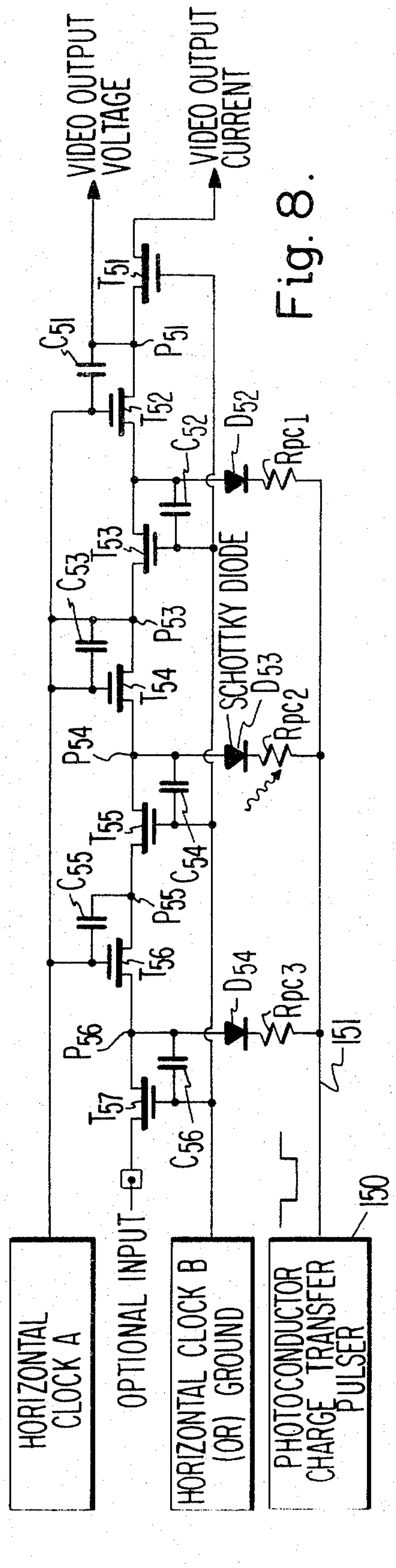
FIG. 8 is a schematic diagram of a photoconductor image sensor embodying the invention.
Figure 10:
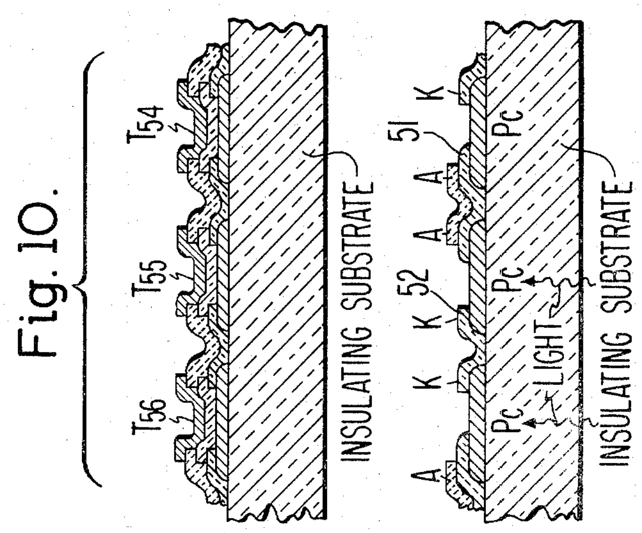
FIG. 10 is a cross-sectional view of portions of the circuit of FIG. 9.
Figure 9:
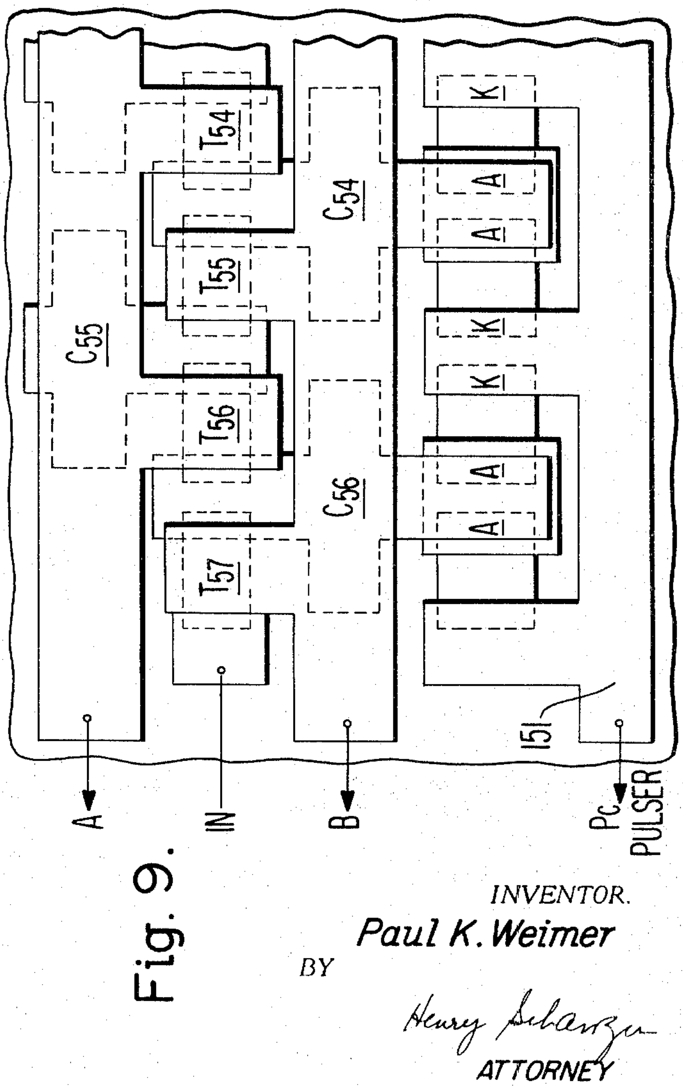
FIG. 9 is a layout of the circuit of FIG. 8.

DETAILED DESCRIPTION OF FIGS. 8, 9, and 10:

In the integrated circuit circuit versions of FIGS. 2 and 6, the photodiodes are an inherent part of the arrays and are formed when the source and drain regions of the MOS transistors are diffused into the surface of a monolithic slab of silicon. In the circuit of FIG. 8 there is shown a portion of one row of an array in which the photo responsive element is not an inherent photodiode but a photoconductor ($R_{PC}$).

The transistors shown in FIG. 8 may be thin-film triode (TFT) devices having the layout shown in FIG. 9 and a cross section as shown in FIG. 10. The gate-to-drain capacitance as in the previous circuits is obtained by overlaying the drain region of a transistor with a metal which forms part of the gate electrode. Each of the even numbered junction points ($P_{52}$, $P_{54}$, $P_{56}$) in FIG. 8 is connected to the anode of a diode ($D_{52}$, $D_{53}$, $D_{54}$) whose cathode is connected to one side of a photoconductor $R_{PC1}$, $R_{PC2}$, $R_{PC3}$, respectively; the other end of the photoconductor being connected to a common line 151 to which is periodically applied a charge transfer pulse from pulser 150. The diodes $D_{52}$, $D_{53}$, $D_{54}$ shown in FIG. 8 are not photo responsive. These diodes are Schottky diodes which act as switches which couple the photoconductors to the capacitors of the bucket brigade when the pulser 151 applies a negative going pulse to pulse line 151.

The negative going pulse is of a polarity to forward bias the diodes so that a current can flow from each of the even numbered junction points into the pulse line creating a charge deficit across the even numbered capacitors. The magnitudes of the currents are determined by the impedances of the respective photoconductors, whose impednaces are proportional to incident light intensity. Therefore, when the photoconductors are switched into the circuit, the charge storage means, which are the even numbered capacitors, will be discharged in proportion to the light incident on their associated photoconductors. When the pulser returns to a level positive with respect to the potential at the even numbered junction points, the photoconductors are cut off from the bucket brigade register. The row can then be pulsed by means of applying clock pulses from horizontal clock generators A and B, causing the information contained in the row to be serially read out either as a video output voltage or as a video output current.

An important advantage of the FIG. 8 circuit is that the light exposure time can be made arbitrarilly short or long compared to the scanning period. When inherent photodiodes are used as a part of the bucket brigade itself, they remain photosensitive during the scanning process (while their information is being read out). If very slow scanning were to be used in the circuits of FIGS. 1 and 7 while the sensor was being illuminated, there would result image smearing since the information contained in one element would be modulated and modified as it passes along the chain of elements. The use of a photoconductor as shown in FIG. 8 which can be switched into and out of the bucket brigade register performs a function analogous to an electronic shutter. That is, when the photoconductors are cut off from the bucket brigade register, they no longer affect the charge contained in the capacitors.

The Schottky diodes in series with the photoconductors can be formed by the use of dissimilar contacts to the photoconductor. Referring to FIG. 10, the area 51 may be a region of tellurium which makes a blocking (or anode) contact to the photoconductor. The latter may be cadmium sulfide (CdS) or cadmium selenide (CdSe) by way of example. The other end of each photoconductor could have indium (52) deposited thereon to make an ohmic (or cathode) contact. The ohmic contacts (52) are then connected in common to a metal strip 151 as shown in FIGS. 8 and 9.

The thin film technique used to fabricate the array as shown in FIG. 8 is particularly useful in manufacturing large sensors which are too large for conventional silicon technology. Due to its low stray capacitance, the thin-film silicon-on-saphire (TFT–SOS) technique or the silicon-on-spinel technique offers a potential advantage in increased speed of operation.

Another feature in using photoconductors is that the photoconductor is capable of high sensitivity (i.e., the impedance of a photoconductor may vary from the order of hundreds of megohms to less than a megohm). In addition, the photoconductor can be readily formed by deposition or by evaporation on glass or on saphire or on saphire or on spinel substrates.

Instead of the Schottky diodes, separate diodes or separate MOS transistors could be used as switches to selectively connect the photoconductors to the bucket brigade register.

Though the circuits of FIGS. 1, 5, and 8 have made use of photodiodes and photoconductors in conjunction with a bucket brigade register, it should be evident that other photoresponsive elements such as phototransistors could be coupled to the bucket brigade register.

Also, photoresponsive elements used in conjunction with the bucket brigade are but an example of transducers responsive to externally applied stimuli which can be used to modify the charge of the capacitors of the bucket brigade stages.

The bucket brigade is normally used as a serial shift register as shown for the V-scan generators 102 and 202 of FIGS. 1 and 5, respectively. That is, a signal is applied at an input point and is serially propagated along the length of the brigade's transmission path until it reaches an output point. Alternately, as taught herein, by means of transcuding elements connected at various junction points of the brigade, information may be fed in parallel into the stages of the register and then read out serially.

What is claimed is:

1. The combination comprising:

A plurality of transistors formed on a common substrate, each transistor having first and second regions defining the ends of a conduction path and a control electrode, the conduction paths of said transistors being connected in series for forming a signal transmission path terminated at one end at an output terminal;

a charge storage means per transistor coupled between the control electrode and the second region of each transistor;

a plurality of transducing elements responsive to externally applied stimuli sharing said substrate;

a plurality of switch means for coupling a different one of said transducing elements to at least every other charge storage means;

means selectively enabling said plurality of switch means for, during the time said plurality of switch means are enabled, transferring charge between said transducing elements and their associated charge storage means for changing the amount of charge stored in a charge storage means in proportion to the stimuli applied to its associated transducing element; and first means connected to the control electrode of every other transistor and second means connected to the control electrode of the remaining transistors for alternately enabling every other transistor and then the remaining transistors, for sequentially transferring charge from one charge storage means to the next along the signal transmission path and for producing a serial output at said output terminal.

2. The combination as claimed in claim 1 wherein each one of said transducing elements comprises a photoconductive element and wherein said substrate is an insulator.

3. A solid state array comprising:

a plurality of rows, each row having a plurality of transistors, each transistor having first and second electrodes defining the ends of a conduction path and a control electrode; the conduction paths of the transistors of a row being connected in series for forming a signal transmission path terminated at one end at an output terminal;

a capacitor per transistor, coupled between the control electrode and one of said first and second electrodes of each transistor;

a photoresponsive element per transistor, each element being common to the capacitor at said one electrode of its associated transistor, said element being poled in a direction to discharge said capacitor as a function of photo signals;

two conductors per row, one conductor being connected to the gate of every other transistor and the other conductor being connected to the gates of the remaining transistors;

a clock terminal for the application thereto of clock pulses;

switch means connected between at least one conductor of each row and said clock terminal for, when enabled, coupling clock pulses present at said clock terminal to its associated conductor for serially reading out the contents of a row and concurrently recharging the capacitors of a row; and scan means comprised solely of one transistor per stage and one stage per row, each transistor of said scan means having an output terminal connected to different one of said switch means for enabling said switch means in sequence for completely reading out and recharging one row and then another one and so on until all the rows are read out.

4. The combination as claimed in claim 3 wherein the other one of the two conductors of each row is connected to a point of reference potential.

5. The combination, as claimed in claim 3, wherein adjacent rows share a common conductor; and further including a second clock terminal, and one switch means per conductor; every other conductor being coupled by a separate switch means to said clock terminal and the remaining conductors being coupled by a separate switch means to said second clock terminal.

6. The combination, as claimed in claim 3, wherein the scan means transistors have their conduction paths connected in series, and each transistor having a capacitor connected between its control electrode and one of its first and second electrodes.

7. The combination, as claimed in claim 6, wherein said scan means includes a first source of clock pulses and means for coupling said first source to the control electrode of every other one of said scan means transistors; and further includes a second source of clock pulses and means for coupling said second source to the control electrode of the remaining ones of said scan means transistors.

* * * * *